United States Patent [19]
Heidelberg

[11] Patent Number: 4,912,996
[45] Date of Patent: Apr. 3, 1990

[54] MOTION CONVERTING MEANS

[76] Inventor: Götz Heidelberg, Am Hügel 16, D-8130 Starnberg-Percha, Fed. Rep. of Germany

[21] Appl. No.: 202,213

[22] Filed: Jun. 3, 1988

[30] Foreign Application Priority Data

Jun. 3, 1987 [DE] Fed. Rep. of Germany ....... 3718614

[51] Int. Cl.[4] ........................ F02B 63/04; F02B 75/32; H02K 7/06

[52] U.S. Cl. ........................................ 74/137; 74/136; 74/138

[58] Field of Search ................. 74/128, 129, 136, 137, 74/138, 139; 123/197 AC

[56] References Cited

U.S. PATENT DOCUMENTS

| | | | |
|---|---|---|---|
| 598,246 | 2/1898 | Hall | 74/137 |
| 611,932 | 10/1898 | Perine | 74/136 |
| 1,651,997 | 12/1927 | Clark | 74/136 |
| 1,660,487 | 2/1928 | Gauthier | 74/129 |
| 3,020,773 | 2/1962 | Golding | 74/128 |
| 3,805,083 | 4/1974 | Demetrescu | 290/1 |
| 4,353,262 | 10/1982 | Talbot | 74/108 |
| 4,694,785 | 9/1987 | Timmerman et al. | 123/197 AC |

FOREIGN PATENT DOCUMENTS

| | | |
|---|---|---|
| 80539 | 3/1894 | Fed. Rep. of Germany . |
| 118435 | 4/1899 | Fed. Rep. of Germany . |
| 3113544 | 9/1982 | Fed. Rep. of Germany . |
| 3539069 | 5/1987 | Fed. Rep. of Germany . |
| 2417009 | 9/1979 | France . |
| 342864 | 1/1960 | Switzerland . |

*Primary Examiner*—Allan D. Herrmann
*Assistant Examiner*—Janice E. Chartoff
*Attorney, Agent, or Firm*—William W. Jones

[57] ABSTRACT

The invention relates to an assembly for converting the reciprocating motion of at least one piston of a combustion engine into an oscillating rotary motion of at least one shaft, the piston being coupled with the shaft via a flexible band connected with a winding on and off area of the shaft. The rotational energy existing in the rotary motion of the shaft is utilized to continue rotation of the shaft in the same direction when the end of the pistons's working stroke is passed, so that the band is then wound onto the winding on and off area of the shaft in the opposite direction, thereby causing the band to pull back the piston. Alternatively, two pistons with opposite working stroke directions are present whose bands are connected to the shaft with opposite directions of winding. Due to a connecting rod between the two pistons, the working stroke of one piston pushes the other piston back to its starting position.

23 Claims, 2 Drawing Sheets

MOTION CONVERTING MEANS

The present invention relates to a means for converting the reciprocating motion of at least one piston of a combustion engine into an oscillating rotary motion of at least one shaft, the piston being coupled with the shaft via a flexible band connected with a winding on and winding off area of the shaft.

The reciprocating piston motion of a combustion engine is usually converted into rotational motion of a crankshaft by a crank mechanism essentially comprising one connecting rod per piston and the crankshaft. Particularly when the piston motion has a large stroke, the conventional crank mechanism is very large and thus heavy and expensive.

Means are already known for converting the reciprocating motion of a piston into an oscillating rotary motion of a shaft using a flexible band between the piston and a winding on and off area on the shaft (U.S. Pat. No. 1,660,487 and German patent No. 118,435). However, since a flexible band can transmit tensile forces but no pressure forces, it cannot press the piston back to the starting point of its working stroke. Thus, a crank mechanism is provided for this purpose in the motion converting means of U.S. Pat. No. 1,660,487. In the motion converting means of German patent No. 118,435, a spring is provided for pulling back the piston via a separate band. The former solution is mechanically complicated and susceptible to wear. In the latter solution, the spring is a heavily stressed part which is difficult to produce with the necessary service life, especially for high duty.

The invention is based on the problem of providing a motion converting means working with a flexible band which effects the return motion of the particular piston to the starting point of its working stroke in a simple and long wearing way.

According to a first aspect of the invention, the rotational energy existing in the particular rotary motion of the shaft is utilized to continue rotation of the shaft in the same direction of rotation when the end of the piston's working stroke is passed, so that the band is then wound onto the winding on and off area of the shaft in the opposite direction of winding, thereby causing the band to pull back the piston. This rotational energy need not consist solely of the rotational energy of the shaft itself; the rotational energy of masses or parts rotating with the shaft can also be utilized.

According to a second aspect of the invention, two pistons with opposite working stroke directions are present whose bands are connected to the shaft with opposite directions of winding, so that when one band is wound on the other band is wound off in each case. Due to a connecting rod between the two pistons, the working stroke of one piston pushes the other piston back to the starting position of its working stroke.

Preferred embodiments of the invention are stated in the dependent claims.

In terms of a definite longitudinal force exerted by the piston, a band subjected to tensile stress has a much smaller cross-section than a connecting rod subjected alternately to tensile stress and pressure. Furthermore, there is no need for an alternately stressed connecting rod bearing, which requires a large bearing surface, depending on the longitudinal force of the piston.

At the beginning of the working stroke motion the piston is located at its top dead center, and at the end of its working stroke motion it is located at its bottom dead center. Bottom dead center of the piston may be geometrically below, above or beside the opposite, "top" dead center, depending on the spatial arrangement of the piston or the combustion engine. One preferably employs a combustion engine having a working stroke for each piston motion from top dead center to bottom dead center, for example a two-stroke engine or an engine with external combustion according to the Stirling principle, so that the flexible band is subjected to tensile force from the piston during each motion of the piston from top dead center to bottom dead center.

Preferable possibilities of engagement between a piston rod like extension of the particular piston and the flexible band are stated in claims 3 to 5 and described in detail below.

Further preferred developments of the invention are stated in claims 6 to 9 and described in detail below.

It is favorable to provide a band on each side of the piston rod like extension of the piston and, in addition, to have these two bands run at least substantially on the center plane of the piston rod like extension to winding on and off areas on the shaft. In this way, the piston rod like extension can be loaded more or less exactly in the middle in the longitudinal direction, and lateral guide forces can be virtually avoided for the piston and the piston rod like extension.

The particular band preferably has a thickness in the range of 1 to 3 mm, which is a good compromise between longitudinal force carrying power and good windability, and a width determined by the longitudinal force to be transmitted. Particularly preferred materials for the band are aramid fibers, polyamide fibers, carbon fibers, steel band, a band-like union of thin steel cables or suitable metallic fabrics.

It is a characteristic of the inventive kind of motion converting means that one cannot directly produce a continuous rotary motion of the shaft in the same direction of rotation, but only an oscillating rotary motion. This oscillating rotary motion can be utilized directly for quite a number of tasks, for example certain drive functions. However, one will often prefer to have a drive source that constantly rotates in the same direction. In order to obtain this, one can connect to the oscillating shaft in particular a mechanical free-wheel or an intermittently meshing and clearing coupling. The coupling is preferably controlled electrically, hydraulically or pneumatically. It need not be a mechanical coupling but may also be, for example, a magnetic coupling or the like.

An especially preferred application for the motion converting means is in a current generator, the current generator being driven by the shaft rotatively in the same direction of rotation in intermittent fashion or in alternating direction of rotation. It has been found according to the invention that this kind of drive can actually be employed well in current generators in spite of the complications one suspects at first glance, in particular because the generated current can be "reworked" electrically, for example rectified or equalized in its time slope.

In order to improve the efficiency of the apparatus, one can provide a separate, intermittently driven generator for each of the two directions of rotation of the shaft, one for a first direction of rotation and the other for an opposite, second direction of rotation.

It is a particularly essential characteristic of the inventive means that the combustion engine can be readily designed with an especially long stroke, in particular with a piston stroke greater than 1.5 times or even greater than 2.0 times the piston diameter. Whereas such a long stroke design can lead to problems in conventional combustion engines, in particular with respect to the lateral forces of the pistons on the cylinder walls, the maximum piston speed at higher engine speeds and the overall volume and construction cost of the crank mechanism, the construction cost increases only slightly with an increase in the piston stroke in the inventive means and the above problems do not result necessarily from the construction principle. The long stroke construction leads in particular to high power density and a good combustion process. It should also be pointed out in this connection that the piston's rate of motion over the piston path essentially follows a sine function in conventional combustion engines due to the crank mechanism, while the piston speed over the piston stroke is much more even in the inventive means. By electronically controlling the generator here, one can even ensure a drive resistance of the generator that is variable during the piston stroke, thereby obtaining a motion pattern involving a more or less even piston speed over the piston stroke, naturally with the exception of the two dead centers. Further, special attention is drawn to the possibility of reducing the drive resistance of the generator as far as possible for the return motion of the particular piston to the starting point of its working stroke, so that this return motion takes place as easily as possible.

An engine particularly preferred for the inventive means is a combustion engine employing the two-stroke method, preferably with pre-compression on the piston rod side of the piston. Such combustion engines have not only the above-mentioned advantage but also the advantages of high efficiency per unit of weight and a simple construction.

The inventive means offers the possibility of controlling top dead center by the generator, in particular by controlling the extent to which the flexible band is wound onto the shaft. This provides the possibility, for example, of varying the compression ratio of the combustion engine. Analogously, one can also control bottom dead center of the piston, so that there is altogether the possibility of varying the cubic capacity of the engine in a simple way.

If it is desirable to compensate more or less the electrical "power gap" of the generator occurring in particular at the dead centers of the piston, an apparatus can preferably be provided having at least two cylinders and pistons whose operation is offset in time in such a way that the dead centers of one piston are precisely between the dead centers of the other piston. A further preferred possibility is to provide additionally a flywheel accumulator which delivers current in the area of the power gap while slowing down and is kept rotating, driven electrically, for example with about twenty per cent of the apparatus power.

If the combustion engine is an external combustion engine according to the Stirling principle, the piston acting on the band can be the so-called working piston of the Stirling engine and a driven displacer piston can be additionally provided for transferring working gas from a cooled region to a heated region and vice versa, with a heat regenerator additionally provided.

Particularly preferred areas of application for current generating means equipped with the inventive motion converting means are the electrical drive of ships, automobiles, utility vehicles and locomotives, whereby the means may be provided lying flat between the axles.

The generator of the current generating means can also be designed as the starter for the combustion engine. An oscillating or an intermittent drive of the starter may in particular be used. The generator is preferably designed with a rotor with as little weight or mass moment of inertia as possible about its rotational axis, which is particularly essential for the constructional variant with a generator driven in alternating directions of rotation.

The invention and developments of the invention shall be explained in more detail in the following with reference to several schematically illustrated embodiments of current generating devices containing inventive motion converting means.

Figure 1A:
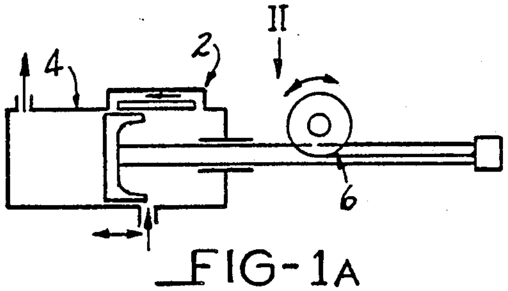
FIG. 1A shows an embodiment of the device of FIG. 1 which utilizes a two-stroke combustion engine.
Figure 1:
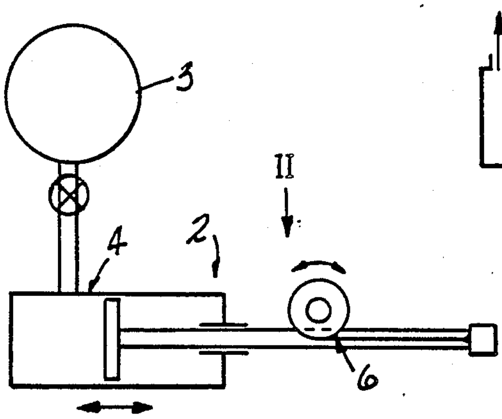
FIG. 1 shows a side view of a current generating device in the axial direction of the generator (line of vision I—I in FIG. 2), with part of the device cut away.
Figure 2:
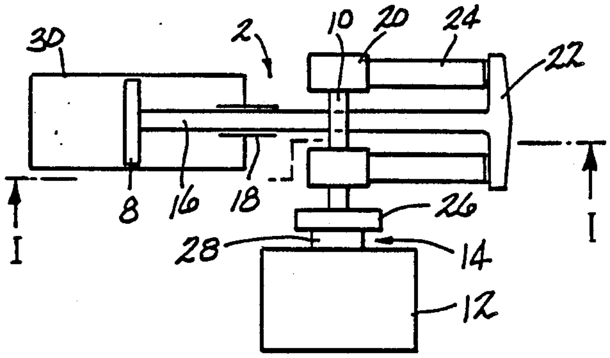
FIG. 2 shows another side view of the device of FIG. 1, in accordance with arrow II in FIG. 1 and at right angles to the line of vision of FIG. 1.

Current generating device 2 shown in FIGS. 1 and 2 comprises essentially a single-cylinder combustion engine 4 (which may be fired by an external combustion chamber 3) without the conventional crank mechanism, a band mechanism 6 for converting the reciprocating motion of piston 8 of the engine into oscillating rotary motion of a shaft 10, a generator 12 and a torque transmission connection 14 between shaft 10 and the rotor (not separately shown) of generator 12.

A piston rod 16 is rigidly connected to the piston, passes through a guide means 18 on one face of the cylinder and is widened in a T shape at the free end. Shaft 10 extends, in the line of vision of FIG. 2, at right angles to piston rod 16 and thereabove. On each side of piston rod 16 a swivel member 20 in the form of a cylindrical roller is attached to shaft 10. From T-shaped head 22 of piston rod 16, a flexible band 24 passes on each side of piston rod 16 to the periphery of associated roller 20, one end of each band being attached to head 22 and the other end of band 24 to an appropriate point on the outer periphery of roller 20. The diameter of rollers 20 is such that bands 24 extend more or less exactly on the center plane of piston rod 16. Furthermore, the diameter of rollers 20 is so great that a band length corresponding to the stroke of piston 8 can be wound on in one layer.

On one side of the piston rod, shaft 10 penetrates a spring unit 26, passing from there into a free-wheel unit 28. The axially other end of free-wheel unit 28 is connected to the rotatable rotor of generator 12 so as to rotate therewith.

When piston 8 is at top dead center, i.e. on the far left in FIGS. 1 and 2, bands 24 are maximally wound onto associated roller 20. When compressed fuel-air mixture is then ignited in cylinder 30 (Otto engine) or fuel is injected into compression-heated air in cylinder 30 (diesel engine), the piston is driven toward its bottom dead center, i.e. toward the right in FIGS. 1 and 2. Head 22 winds bands 24 off rollers 20 tractively, thereby causing shaft 10 to rotate in a first direction of rotation. With this first direction of rotation, free-wheel unit 28 transmits the torque of shaft 10 to the rotor of generator 12 which thus rotates and generates current. In spring unit 26 there is a spring which is increasingly deformed by rotation of shaft 10 in the first direction of rotation.

When piston 8 has reached the area of its bottom dead center, the force of the bent spring in spring unit 26 is so great that the direction of rotation of shaft 10 reverses to a second direction of rotation. With the second direction of rotation, free-wheel unit 28 interrupts the flow of torque between shaft 10 and generator 12. Bands 24 are wound on tractively toward the left in FIGS. 1 and 2 by shaft 10 or rollers 20, carrying piston 8 back toward the left to top dead center via head 22 and piston rod 16. Combustion engine 4 is a two-stroke engine, so that the same cycle as described then repeats itself. By appropriately controlling the excitation of generator 12, for example, one can ensure, if desired, that the rotor of generator 12 has at least essentially just come to a stop when piston 8 is at top dead center. Free-wheel unit 28 can then lock without a speed difference. However, operation is also possible by which the rotor of generator 12 continues to rotate or has already stood still when piston 8 reaches its top dead center.

It is pointed out that current generating device 2 need not necessarily have free-wheel unit 28. Spring unit 26 may also be dimensioned in such a way that it both effects the return motion of piston 8 from bottom dead center to top dead center and rotates the rotor of generator 12 (back) in the second direction of rotation during this time span. During this time period one could, if desired, reduce the excitation of generator 12 in such a way that spring unit 26 need apply as little power as possible for rotating the rotor of generator 12 in the second direction of rotation.

Since generator 12 is driven unevenly, seen over time, and possibly with changing directions of rotation, there is an uneven flow of the generated current over time. Current flow changes can be eliminated, for example, by cyclical pole reversal. Otherwise, one can obviate the fluctuations in time, if necessary, by interconnecting a plurality of such current generating devices 2, for example.

The replacement of a crank mechanism by described band mechanism 6 also means that one is largely free in fixing the top and/or bottom dead center of piston 8. This may be useful, for example, for varying the compression ratio of combustion engine 4 or for varying the active cubic capacity of engine 4.

Figure 3:
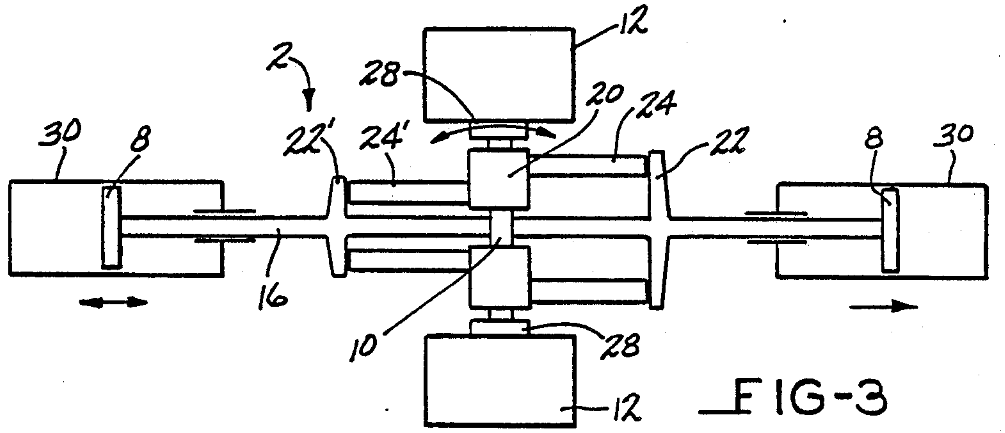
FIG. 3 shows a further embodiment of a current generating device in a line of vision analogous to FIG. 2.

The second embodiment of a current generating device 2 as in FIG. 3 differs from the above-described first embodiment, first of all, in that combustion engine 4 has two aligned cylinders 30 each with a piston 8, and in that the two pistons 8 are interconnected by a common piston rod 16. Piston rod 16 is provided with two T-portions 22 and 22'. Between the two T-portions 22 and 22', shaft 10 is disposed as in the first embodiment, although no spring unit 27 is present. From T-portion 22 on the right in FIG. 3, the two bands 24 pass to the two rollers 20 of shaft 10 just as in the first embodiment. In addition, however, two further bands 24' pass from T-portion 22' on the left in FIG. 3 to rollers 20, each on the inside beside the particular band 24 regarded in the axial direction of shaft 10 or rolls 20. When bands 24 are wound tractively off rollers 20, bands 24' are at the same time wound onto rollers 20. When the two pistons 8 move from the left to the right in FIG. 3, i.e. left-hand piston 8 moves from top dead center to bottom dead center and right-hand piston 8 moves from bottom dead center to top dead center, bands 24 are thus wound off tractively, and when the two pistons 8 move in the opposite directions bands 24' are wound off tractively.

The second embodiment also differs from the first embodiment in that a free-wheel unit 28 and a generator 12 are provided on each axial end of shaft 10. When the two pistons 8 move in one direction, one free-wheel unit 28 engages so that one generator 12 is driven. When the two pistons 8 move in the opposite direction, the other free-wheel unit 28 engages so that the other generator 12 is driven.

Alternatively, it is possible to dispense with the two free-wheel units 28, so that the two generators are driven in oscillating fashion. It is also possible, alternatively, to use only one generator 12 and dispense with a free-wheel unit 28.

It is also pointed out that the two pistons 8 need not necessarily be interconnected by a common piston rod 16. Instead, the two pistons 8 may work with their own piston rods 16 and band mechanisms 6 on a common shaft 10 in such a way that the two pistons rods are staggered in the axial direction of shaft 10.

In the further embodiments described below, generator 12 connected to shaft 10 is omitted in the drawing for the sake of clarity.

Figure 4:
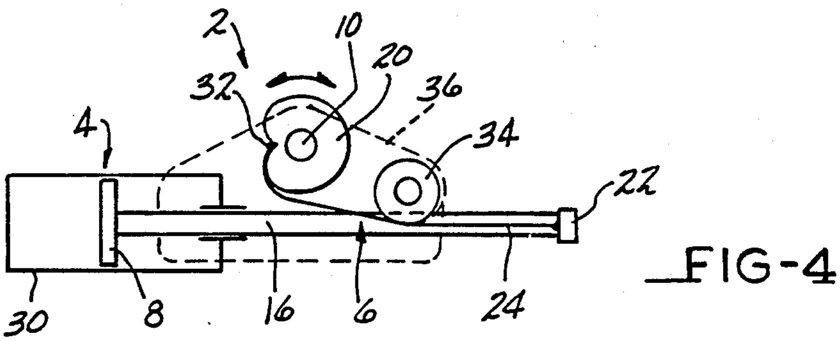
FIG. 4 shows a further embodiment of a current generating device in a line of vision analogous to FIG. 1.
Figure 5:
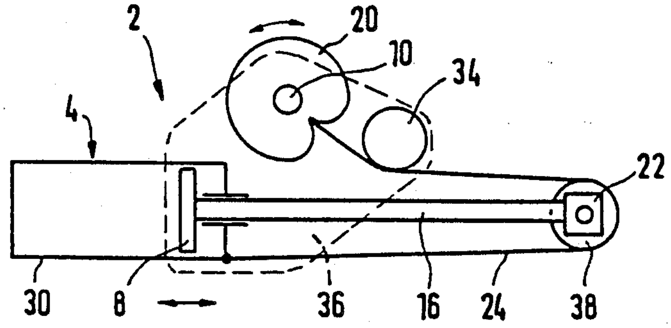
FIG. 5 shows a further embodiment of a current generating device in a line of vision analogous to FIG. 1.
Figure 6:
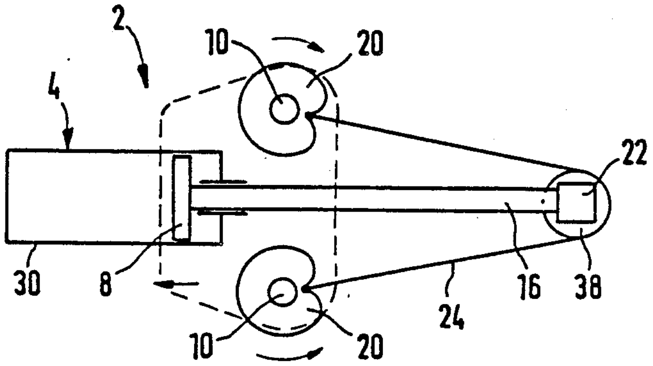
FIG. 6 shows a further embodiment of a current generating device in a line of vision analogous to FIG. 1.

The third embodiment as in FIG. 4 differs very essentially from the first embodiment in that the outer periphery of swivel member 20 has the shape of a cylindrical roller with a depression resembling the upper half of a heart in one peripheral area. This swivel member is therefore referred to as "heart roller 20" in the following. The end of each band 24 on the swivel member side is attached to the inner tip of depression 32. Further, a deflection roller 34 is provided for each band 24, causing band 24 initially to extend on the center plane of piston rod 16 in the view of FIG. 4 just as in the first embodiment and then, closer to cylinder 30, to bend slightly upward toward the outer periphery of heart roller 20. Another very essential difference to the first and second embodiments is that heart roller 20 is provided in such a way that its depression tip 32 points in the longitudinal direction of band 24 between roller 20 and deflection roller 34 when piston 8 has reached bottom dead center. This state is shown in FIGS. 5 and 6 for the fourth and fifth embodiments. This means that band 24 is wound off heart roller 20 tractively when piston 8 moves from top dead center to bottom dead center while heart roller 20 rotates in a first direction of rotation, and that heart roller 20 continues to rotate in this first direction of rotation when piston 8 then returns from bottom dead center to top dead center. Thus, band 24 is wound onto heart roller 20 beginning, so to speak, on the peripherally other side of the depression tip. Only when piston 8 moves from top dead center to bottom dead center the next time does the first direction of rotation of heart roller 20 reverse to a second direction of rotation, which is in turn retained until piston 8 has come back to top dead center.

Consequently, the third embodiment is characterized in that shaft 10 to which heart roller 20 is attached, and thus also generator 12 (not shown) connected to shaft 10, are not slowed down to speed 0 and then accelerated in the opposite direction of rotation when piston 8 reaches bottom dead center; this slowing down and acceleration only take place in the area of the piston's top dead center. The rotational inertia of the rotor of generator 12, in particular, or the rotational energy stored therein when piston 8 reaches bottom dead center; thus fetches piston 8 back to top dead center subjecting band 24 to tensile stress. This reduces the speed of generator 12, so that piston 8 runs most functionally to top dead center at decreasing speed. One can even go so far as to control the excitation of generator 12 in accordance with the return motion of piston 8 to top dead center in such a way that piston 8 arrives at top dead center at a speed close to zero.

The depression with its rounded transition to the remaining, cylindrical periphery of heart roller 20 keeps the alternate bending stress of band 24 small in this area although it is being wound on alternatively on one peripheral side and the other peripheral side beside depression 32.

Reference number 36 and the associated dashed lines indicate a bearing plate attached to cylinder 30 and serving as a bearing for shaft 10 and the axle of deflection roller 34.

Of course, the third embodiment, regarded in the line of vision of FIG. 2, has two heart rollers 20 and two bands 24 as in the first embodiment. Accordingly, two reflection rollers 34 are also provided on a common axle. Two bearing plates 36 are each present axially outside described rollers 20, 34. At the end facing away from cylinder 30, bearing plates 36 may be prolonged further than shown in FIG. 4, and a second guide means may be present there for head 22 of piston rod 16. A spring unit 26 and a free-wheel unit 28 are unnecessary in the third embodiment.

The fourth embodiment as in FIG. 5 essentially differs from the third embodiment only in that a further deflection roller 38 is disposed on head 22 of piston rod 16 for deflecting band 24 by about 180°. The end of band 24 that was attached to head 22 in the third embodiment is attached, in the fourth embodiment, to cylinder 30 or another suitable part between the two bearing plates 36. Consequently, when piston 8 covers a path x a piece of band with the length 2x is wound off or on. Otherwise, the motion pattern of heart roller 20 in accordance with the motion of piston 8 is as already described in connection with the third embodiment. The (first) deflection roller 34 in the band area between head 22 and heart roller 22 is disposed relative to piston rod 16 in such a way that band 24 runs at virtually the same angle to piston rod 16 above and below piston rod 16, seen in FIG. 5, so that piston rod 16 is virtually subjected strictly to pressure. The fourth embodiment also has the advantage that one can readily use only one band 24, one heart roller 20 and one (first) deflection roller 34.

The fifth embodiment as in FIG. 6 differs from the fourth embodiment in that the end of band 24 that was directed in the fourth embodiment to cylinder 30 or an attachment member between bearing plates 36, is directed to a second heart roller 20 disposed symmetrically to first heart roller 20, below piston rod 16, seen in FIG. 6. Of course, second heart roller 20 is also seated on a shaft 10 and each of the two shafts 10 is connected to a separate generator 12. If both generators 12 are large, one can be disposed behind the plane of projection in FIG. 6 and the other before the plane of projection in FIG. 6. (First) deflection rollers 34 are unnecessary in the fifth embodiment because the assembly is symmetrical to piston rod 16. The most favorable design is for the two heart rollers 20 always to rotate in opposite directions.

Figure 7:
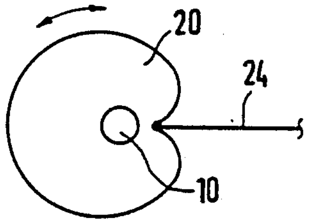
FIGS. 7 and 8 show modified embodiments of a swivel member.

FIG. 7 shows a modification in which heart roller 20 is seated off-center on shaft 10 so that the distance between the winding on peripheral surface of heart roller 20 and the rotational axis over a winding angle of 180° always increases, symmetrically for both directions of rotation. This makes it possible to vary the speed of shaft 10 due to a change in the transmission ratio, so to speak, in the course of the stroke of piston 8, even if piston 8 moves at constant speed. Other changes in the distance between the winding on surface of swivel member 20 and its rotational axis over the peripheral angle are also possible to meet particular requirements.

Figure 8:
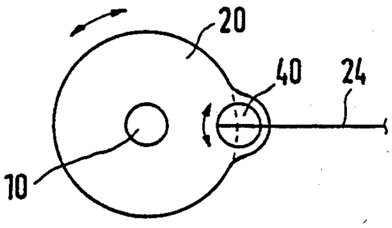

The modification of swivel member 20 shown in FIG. 8 consists in that the end of the band is not attached directly to swivel member 20 itself, but to a cylindrical intermediate member 40 which is in turn pivoted about its axis on swivel member 20. In this way a reversed bending stress of band 24 can be almost entirely eliminated when it passes from being wound off one peripheral side of intermediate member 40 to being wound onto the other peripheral side of intermediate member 40.

Instead of free-wheel unit 28 described above in some embodiments, an intermittently meshing and clearing coupling can also be provided which fulfills virtually the same function.

The embodiments described above may also be constructed without the particular generator 12. In this case the rotary motion of shaft 10 can be utilized as a source of mechanical power.

I claim:

1. A means for converting the reciprocating motion of a piston of a combustion engine into a rotary motion of at least one shaft, comprising (a) a winding on and winding off area on the shaft;

(b) a flexible band attached at one end to the winding on and off area;

(c) a rod like extension of the piston which is engaged with the flexible band in such a way that the band is wound tractively off the winding on and off area by the working stroke of the piston;

(d) means for ensuring that the shaft continues rotating after the end of the working stroke thereby rewinding the band on said winding on and off area and causing the band to pull back the piston.

2. A means for converting the reciprocating motion of two pistons of a combustion engine into an oscillating rotary motion of at least one shaft, comprising:

(a) a winding on and winding off area on the shaft (10);

(b) a first flexible band attached at one end to the winding on and off area;

(c) a second flexible band attached at one end to the winding on and off area;

(d) a connecting rod between the first and second pistons which is engaged with the first flexible band in such a way that the first band is wound tractively off the winding on and off area by the working stroke of the first piston, and with the second flexible band in such a way that the second band is wound tractively off the winding on and off area by the working stroke of the second piston; and (e) opposite working stroke directions of the two pistons so that when the first band is tractively wound off the second piston is pressed back and the second band wound on, and when the second band is tractively wound off the first piston is pressed back and the first band wound on.

3. A means according to claim 1, wherein the band is attached at the other end to the piston rod like extension of the piston.

4. A means according to claim 1, wherein the band is fixed at the other end and directed via a deflection roller on the piston rod like extension of the piston.

5. A means according to claim 1, wherein the band is attached at the other end to a winding on and off area on a further shaft, which it is wound off during the working stroke of the piston and which it is wound on during the opposite stroke of the piston.

6. A means according to claim 1, comprising a deflection roller for the band so that a partial length of the band extends substantially parallel to the piston rod like extension of the piston.

7. A means according to claim 1, wherein the winding on and off area has a heart-shaped outer periphery.

8. A means according to claim 1, wherein the band is attached to said area by means of an intermediate member rotatable relative to the winding on and off area.

9. A means according to claim 1, wherein the distance between the outer periphery of the winding on and off area and the rotational axis of the shaft varies along the outer periphery.

10. A means according to claim 1, wherein the shaft is connected via at least one free-wheel to at least one element to be rotatively driven.

11. A means according to claim 1, wherein the shaft is connected via at least one intermittently meshing and clearing coupling to at least one element to be rotatively driven.

12. A means according to claim 1, which is part of a current generator in which a generator is adapted to be driven by the shaft.

13. A means according to claim 12, wherein a separate generator is provided for each of the two directions of rotation of the shaft.

14. A means according to claim 1, wherein the combustion engine is an engine with external combustion.

15. A means according to claim 2, wherein the shaft is connected via at least one free-wheel to at least one element to be rotatively driven.

16. A means according to claim 2, wherein the shaft is connected via at least one intermittently meshing and clearing coupling to at least one element to be rotatively driven.

17. A means according to claim 2, which is part of a current generator in which a generator is adapted to be driven by the shaft.

18. A means according to claim 18, wherein a separate generator is provided for each of the two directions of rotation of the shaft.

19. A means according to claim 2, wherein the combustion engine is an engine with external combustion.

20. A means according to claim 2 wherein the combustion engine is a two-stroke engine.

21. A means according to claim 1 wherein the combustion engine is a two-stroke engine.

22. A means according to claim 1 wherein said means for ensuring that the shaft continues rotating is operable to produce continued rotation of said shaft in the same direction of rotation as that which occurs during said working stroke of the piston.

23. A means according to claim 1 wherein said means for ensuring that the shaft continues rotating is operable to produce continued rotation of said shaft in the opposite direction of rotation as that which occurs during said working stroke of the piston.

* * * * *